United States Patent
Gally et al.

(10) Patent No.: US 7,675,669 B2
(45) Date of Patent: Mar. 9, 2010

(54) METHOD AND SYSTEM FOR DRIVING INTERFEROMETRIC MODULATORS

(75) Inventors: Brian J. Gally, Los Gatos, CA (US); William J. Cummings, Millbrae, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 170 days.

(21) Appl. No.: 11/218,887

(22) Filed: Sep. 2, 2005

(65) Prior Publication Data

US 2006/0067653 A1 Mar. 30, 2006

Related U.S. Application Data

(60) Provisional application No. 60/613,319, filed on Sep. 27, 2004.

(51) Int. Cl.
*G02F 1/01* (2006.01)
*G02B 26/00* (2006.01)

(52) U.S. Cl. .................. 359/288; 359/289; 359/291

(58) Field of Classification Search ............... 359/288, 359/289, 290, 291, 292, 295, 298, 297
See application file for complete search history.

(56) References Cited

U.S. PATENT DOCUMENTS

| | | | |
|---|---|---|---|
| 3,982,239 A | 9/1976 | Sherr | |
| 4,403,248 A | 9/1983 | te Velde | |
| 4,441,791 A | 4/1984 | Hornbeck | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,566,935 A | 1/1986 | Hornbeck | |
| 4,571,603 A | 2/1986 | Hornbeck et al. | |
| 4,596,992 A | 6/1986 | Hornbeck | |

(Continued)

FOREIGN PATENT DOCUMENTS

EP 0295802 A 12/1988

(Continued)

OTHER PUBLICATIONS

Bains, "Digital Paper Display Technology holds Promise for Portables", CommsDesign EE Times (2000).

(Continued)

*Primary Examiner*—Ricky L Mack
*Assistant Examiner*—Brandi N Thomas
(74) *Attorney, Agent, or Firm*—Knobbe Martens Olson & Bear, LLP

(57) ABSTRACT

Systems and methods for driving a display of MEMS devices are disclosed. In one embodiment, a display includes an array comprising a plurality of interferometric modulators, and a driving circuit coupled to said array, said driving circuit configured to provide actuation signals to drive said array based on a temperature of the display. In another embodiment, a method of driving an array having a plurality of interferometric modulators configured into a display is disclosed, where the method includes sensing the temperature at a predetermined location in display, communicating a signal based on the sensed temperature to a display driver, generating an actuation signal to drive said display based on the received signal, and providing the actuation signal to the array.

33 Claims, 13 Drawing Sheets

U.S. PATENT DOCUMENTS

| | | | |
|---|---|---|---|
| 4,615,595 A | 10/1986 | Hornbeck | |
| 4,662,746 A | 5/1987 | Hornbeck | |
| 4,672,327 A * | 6/1987 | Wittlinger | 330/269 |
| 4,681,403 A | 7/1987 | te Velde et al. | |
| 4,709,995 A | 12/1987 | Kuribayashi et al. | |
| 4,710,732 A | 12/1987 | Hornbeck | |
| 4,856,863 A | 8/1989 | Sampsell et al. | |
| 4,859,060 A | 8/1989 | Katagiri et al. | |
| 4,868,381 A * | 9/1989 | Davis | 250/227.27 |
| 4,954,789 A | 9/1990 | Sampsell | |
| 4,956,619 A | 9/1990 | Hornbeck | |
| 4,982,184 A | 1/1991 | Kirkwood | |
| 5,018,256 A | 5/1991 | Hornbeck | |
| 5,028,939 A | 7/1991 | Hornbeck et al. | |
| 5,037,173 A | 8/1991 | Sampsell et al. | |
| 5,055,833 A | 10/1991 | Hehlen et al. | |
| 5,061,049 A | 10/1991 | Hornbeck | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,142,405 A | 8/1992 | Hornbeck | |
| 5,142,414 A | 8/1992 | Koehler et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,212,582 A | 5/1993 | Nelson | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,227,900 A | 7/1993 | Inaba et al. | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,287,215 A | 2/1994 | Warde et al. | |
| 5,296,950 A | 3/1994 | Lin et al. | |
| 5,305,640 A | 4/1994 | Boysel et al. | |
| 5,312,513 A | 5/1994 | Florence et al. | |
| 5,323,002 A | 6/1994 | Sampsell et al. | |
| 5,325,116 A | 6/1994 | Sampsell | |
| 5,327,286 A | 7/1994 | Sampsell et al. | |
| 5,331,454 A | 7/1994 | Hornbeck | |
| 5,339,116 A | 8/1994 | Urbanus et al. | |
| 5,365,283 A | 11/1994 | Doherty et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,461,411 A | 10/1995 | Florence et al. | |
| 5,488,505 A | 1/1996 | Engle | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,563,398 A | 10/1996 | Sampsell | |
| 5,567,334 A | 10/1996 | Baker et al. | |
| 5,570,135 A | 10/1996 | Gove et al. | |
| 5,578,976 A | 11/1996 | Yao | |
| 5,581,272 A | 12/1996 | Conner et al. | |
| 5,583,688 A | 12/1996 | Hornbeck | |
| 5,589,852 A | 12/1996 | Thompson et al. | |
| 5,597,736 A | 1/1997 | Sampsell | |
| 5,598,565 A | 1/1997 | Reinhardt | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,612,713 A | 3/1997 | Bhuva et al. | |
| 5,619,061 A | 4/1997 | Goldsmith et al. | |
| 5,619,365 A | 4/1997 | Rhoades et al. | |
| 5,619,366 A | 4/1997 | Rhoads et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,638,084 A | 6/1997 | Kalt | |
| 5,638,946 A | 6/1997 | Zavracky | |
| 5,646,768 A | 7/1997 | Kaeiyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,745,193 A | 4/1998 | Urbanus et al. | |
| 5,745,281 A | 4/1998 | Yi et al. | |
| 5,754,160 A | 5/1998 | Shimizu et al. | |
| 5,771,116 A | 6/1998 | Miller et al. | |
| 5,784,189 A | 7/1998 | Bozler et al. | |
| 5,784,212 A | 7/1998 | Hornbeck | |
| 5,808,780 A | 9/1998 | McDonald | |
| 5,818,095 A | 10/1998 | Sampsell | |
| 5,835,255 A | 11/1998 | Miles | |
| 5,842,088 A | 11/1998 | Thompson | |
| 5,867,302 A | 2/1999 | Fleming et al. | |
| 5,912,758 A | 6/1999 | Knipe et al. | |
| 5,943,158 A | 8/1999 | Ford et al. | |
| 5,959,763 A | 9/1999 | Bozler et al. | |
| 5,966,235 A | 10/1999 | Walker et al. | |
| 5,986,796 A | 11/1999 | Miles | |
| 6,028,690 A | 2/2000 | Carter et al. | |
| 6,038,056 A | 3/2000 | Florence et al. | |
| 6,040,937 A | 3/2000 | Miles | |
| 6,049,317 A | 4/2000 | Thompson et al. | |
| 6,055,090 A * | 4/2000 | Miles | 359/291 |
| 6,061,075 A | 5/2000 | Nelson et al. | |
| 6,099,132 A | 8/2000 | Kaeriyama | |
| 6,100,872 A | 8/2000 | Aratani et al. | |
| 6,113,239 A | 9/2000 | Sampsell et al. | |
| 6,147,790 A | 11/2000 | Meier et al. | |
| 6,160,833 A | 12/2000 | Floyd et al. | |
| 6,180,428 B1 | 1/2001 | Peeters et al. | |

| | | | | | | |
|---|---|---|---|---|---|---|
| 6,201,633 B1 | 3/2001 | Peeters et al. | | 7,274,347 B2 | 9/2007 | Richards |
| 6,232,936 B1 | 5/2001 | Gove et al. | | 2001/0003487 A1 | 6/2001 | Miles |
| 6,263,146 B1 * | 7/2001 | Umeno et al. ............... 385/147 | | 2001/0034075 A1 | 10/2001 | Shigeru |
| 6,275,326 B1 | 8/2001 | Bhalla et al. | | 2001/0043171 A1 | 11/2001 | Van Gorkom et al. |
| 6,282,010 B1 | 8/2001 | Sulzbach et al. | | 2001/0046081 A1 | 11/2001 | Hayashi et al. |
| 6,295,154 B1 | 9/2001 | Laor et al. | | 2001/0051014 A1 | 12/2001 | Behin et al. |
| 6,304,297 B1 | 10/2001 | Swan | | 2002/0000959 A1 | 1/2002 | Colgan et al. |
| 6,323,982 B1 | 11/2001 | Hornbeck | | 2002/0005827 A1 | 1/2002 | Kobayashi |
| 6,327,071 B1 | 12/2001 | Kimura | | 2002/0012159 A1 | 1/2002 | Tew |
| 6,356,085 B1 | 3/2002 | Ryat et al. | | 2002/0015215 A1 | 2/2002 | Miles |
| 6,356,254 B1 | 3/2002 | Kimura | | 2002/0024711 A1 | 2/2002 | Miles |
| 6,429,601 B1 | 8/2002 | Friend et al. | | 2002/0036304 A1 | 3/2002 | Ehmke et al. |
| 6,433,917 B1 | 8/2002 | Mei et al. | | 2002/0050882 A1 | 5/2002 | Hyman et al. |
| 6,447,126 B1 | 9/2002 | Hornbeck | | 2002/0054424 A1 | 5/2002 | Miles et al. |
| 6,465,355 B1 | 10/2002 | Horsley | | 2002/0075226 A1 | 6/2002 | Lippincott |
| 6,466,358 B2 | 10/2002 | Tew | | 2002/0075555 A1 | 6/2002 | Miles |
| 6,473,274 B1 | 10/2002 | Maimone et al. | | 2002/0093722 A1 | 7/2002 | Chan et al. |
| 6,480,177 B2 | 11/2002 | Doherty et al. | | 2002/0097133 A1 | 7/2002 | Charvet et al. |
| 6,480,645 B1 | 11/2002 | Peale et al. | | 2002/0126364 A1 | 9/2002 | Miles |
| 6,496,122 B2 | 12/2002 | Sampsell | | 2002/0179421 A1 | 12/2002 | Williams et al. |
| 6,501,107 B1 | 12/2002 | Sinclair et al. | | 2002/0181070 A1 | 12/2002 | Hewlett |
| 6,507,330 B1 | 1/2003 | Handschy et al. | | 2002/0186108 A1 | 12/2002 | Hallbjorner |
| 6,507,331 B1 | 1/2003 | Schlangen et al. | | 2003/0004272 A1 | 1/2003 | Power |
| 6,545,335 B1 | 4/2003 | Chua et al. | | 2003/0020699 A1 | 1/2003 | Nakatani et al. |
| 6,548,908 B2 | 4/2003 | Chua et al. | | 2003/0043157 A1 | 3/2003 | Miles |
| 6,549,338 B1 | 4/2003 | Wolverton et al. | | 2003/0072070 A1 | 4/2003 | Miles |
| 6,552,840 B2 | 4/2003 | Knipe | | 2003/0122773 A1 | 7/2003 | Washio et al. |
| 6,574,033 B1 | 6/2003 | Chui et al. | | 2003/0137215 A1 | 7/2003 | Cabuz |
| 6,589,625 B1 | 7/2003 | Kothari et al. | | 2003/0137521 A1 | 7/2003 | Zehner et al. |
| 6,593,934 B1 | 7/2003 | Liaw et al. | | 2003/0189536 A1 | 10/2003 | Ruigt |
| 6,600,201 B2 | 7/2003 | Hartwell et al. | | 2003/0202264 A1 | 10/2003 | Weber et al. |
| 6,606,175 B1 | 8/2003 | Sampsell et al. | | 2003/0202265 A1 | 10/2003 | Reboa et al. |
| 6,625,047 B2 | 9/2003 | Coleman, Jr. | | 2003/0202266 A1 | 10/2003 | Ring et al. |
| 6,630,786 B2 | 10/2003 | Cummings et al. | | 2004/0008396 A1 | 1/2004 | Stappaerts |
| 6,632,698 B2 | 10/2003 | Ives | | 2004/0022044 A1 | 2/2004 | Yasuoka et al. |
| 6,643,069 B2 | 11/2003 | Dewald | | 2004/0027701 A1 | 2/2004 | Ishikawa |
| 6,650,455 B2 | 11/2003 | Miles | | 2004/0051929 A1 | 3/2004 | Sampsell et al. |
| 6,666,561 B1 | 12/2003 | Blakley | | 2004/0058532 A1 | 3/2004 | Miles et al. |
| 6,674,090 B1 | 1/2004 | Chua et al. | | 2004/0080807 A1 | 4/2004 | Chen et al. |
| 6,674,562 B1 | 1/2004 | Miles | | 2004/0114210 A1 | 6/2004 | Fitzpatrick et al. |
| 6,680,792 B2 | 1/2004 | Miles | | 2004/0145049 A1 | 7/2004 | McKinnell et al. |
| 6,710,908 B2 | 3/2004 | Miles et al. | | 2004/0147056 A1 | 7/2004 | McKinnell et al. |
| 6,741,377 B2 | 5/2004 | Miles | | 2004/0160143 A1 | 8/2004 | Shreeve et al. |
| 6,741,384 B1 | 5/2004 | Martin et al. | | 2004/0174583 A1 | 9/2004 | Chen et al. |
| 6,741,503 B1 | 5/2004 | Farris et al. | | 2004/0179281 A1 | 9/2004 | Reboa |
| 6,747,785 B2 | 6/2004 | Chen et al. | | 2004/0212026 A1 | 10/2004 | Van Brocklin et al. |
| 6,762,873 B1 | 7/2004 | Coker et al. | | 2004/0217378 A1 | 11/2004 | Martin et al. |
| 6,775,174 B2 | 8/2004 | Huffman et al. | | 2004/0217919 A1 | 11/2004 | Pichl et al. |
| 6,778,155 B2 | 8/2004 | Doherty et al. | | 2004/0218251 A1 | 11/2004 | Piehl et al. |
| 6,781,643 B1 | 8/2004 | Watanabe et al. | | 2004/0218334 A1 | 11/2004 | Martin et al. |
| 6,787,384 B2 | 9/2004 | Okumura | | 2004/0218341 A1 | 11/2004 | Martin et al. |
| 6,787,438 B1 | 9/2004 | Nelson | | 2004/0223204 A1 | 11/2004 | Mao et al. |
| 6,788,520 B1 | 9/2004 | Behin et al. | | 2004/0227493 A1 | 11/2004 | Van Brocklin et al. |
| 6,794,119 B2 | 9/2004 | Miles | | 2004/0240032 A1 | 12/2004 | Miles |
| 6,798,561 B2 * | 9/2004 | Huibers ...................... 359/291 | | 2004/0240138 A1 | 12/2004 | Martin et al. |
| 6,811,267 B1 | 11/2004 | Allen et al. | | 2004/0245588 A1 | 12/2004 | Nikkel et al. |
| 6,813,060 B1 | 11/2004 | Garcia et al. | | 2004/0263944 A1 | 12/2004 | Miles et al. |
| 6,819,469 B1 | 11/2004 | Koba | | 2005/0001828 A1 | 1/2005 | Martin et al. |
| 6,822,628 B2 | 11/2004 | Dunphy et al. | | 2005/0012577 A1 | 1/2005 | Pillans et al. |
| 6,829,132 B2 | 12/2004 | Martin et al. | | 2005/0038950 A1 | 2/2005 | Adelmann |
| 6,853,129 B1 | 2/2005 | Cummings et al. | | 2005/0057442 A1 | 3/2005 | Way |
| 6,855,610 B2 | 2/2005 | Tung et al. | | 2005/0068583 A1 | 3/2005 | Gutkowski et al. |
| 6,859,218 B1 | 2/2005 | Luman et al. | | 2005/0069209 A1 | 3/2005 | Damera-Venkata et al. |
| 6,861,277 B1 | 3/2005 | Monroe et al. | | 2005/0116924 A1 | 6/2005 | Sauvante et al. |
| 6,862,022 B2 | 3/2005 | Slupe | | 2005/0152015 A1 | 7/2005 | Anderson et al. |
| 6,862,029 B1 | 3/2005 | D'Souza et al. | | 2005/0206991 A1 | 9/2005 | Chui et al. |
| 6,867,896 B2 | 3/2005 | Miles | | 2005/0286113 A1 | 12/2005 | Miles |
| 6,870,581 B2 | 3/2005 | Li et al. | | 2005/0286114 A1 | 12/2005 | Miles |
| 6,903,860 B2 | 6/2005 | Ishii | | 2006/0044246 A1 | 3/2006 | Mignard |
| 6,950,222 B2 * | 9/2005 | Ibe et al. .................... 359/279 | | 2006/0044298 A1 | 3/2006 | Mignard et al. |
| 7,034,783 B2 | 4/2006 | Gates et al. | | 2006/0044928 A1 | 3/2006 | Chui et al. |
| 7,123,216 B1 | 10/2006 | Miles | | 2006/0056000 A1 | 3/2006 | Mignard |
| 7,161,728 B2 | 1/2007 | Sampsell et al. | | 2006/0057754 A1 | 3/2006 | Cummings |

| | | | |
|---|---|---|---|
| 2006/0066542 A1 | 3/2006 | Chui | |
| 2006/0066559 A1 | 3/2006 | Chui et al. | |
| 2006/0066560 A1 | 3/2006 | Gally et al. | |
| 2006/0066561 A1 | 3/2006 | Chui et al. | |
| 2006/0066594 A1 | 3/2006 | Tyger | |
| 2006/0066597 A1 | 3/2006 | Sampsell | |
| 2006/0066598 A1 | 3/2006 | Floyd | |
| 2006/0066601 A1 | 3/2006 | Kothari | |
| 2006/0066937 A1 | 3/2006 | Chui | |
| 2006/0066938 A1 | 3/2006 | Chui | |
| 2006/0067648 A1 | 3/2006 | Chui et al. | |
| 2006/0077127 A1 | 4/2006 | Sampsell et al. | |
| 2006/0077505 A1 | 4/2006 | Chui et al. | |
| 2006/0077520 A1 | 4/2006 | Chui et al. | |
| 2006/0103613 A1 | 5/2006 | Chui | |
| 2006/0250350 A1 | 11/2006 | Kothari et al. | |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0 417 523 A | 3/1991 |
| EP | 0 467 048 A | 1/1992 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0725380 A1 | 8/1996 |
| EP | 0852371 A1 | 7/1998 |
| EP | 0911794 A1 | 4/1999 |
| EP | 1 017 038 A | 7/2000 |
| EP | 1 146 533 A | 10/2001 |
| EP | 1343190 A | 9/2003 |
| EP | 1345197 A | 9/2003 |
| EP | 1381023 A | 1/2004 |
| EP | 1473691 A2 | 11/2004 |
| GB | 2401200 A | 11/2004 |
| JP | 2004-29571 | 1/2004 |
| WO | WO 95/30924 | 11/1995 |
| WO | WO 97/17628 | 5/1997 |
| WO | WO 99/52006 A3 | 10/1999 |
| WO | WO 01/73937 A | 10/2001 |
| WO | WO 02/086582 | 10/2002 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |
| WO | WO 2006/036844 A2 | 4/2006 |

OTHER PUBLICATIONS

Lieberman, "MEMS Display Looks to give PDAs Sharper Image" EE Times (2004).

Lieberman, "Microbridges at heart of new MEMS displays" EE Times (2004).

Peroulis et al., Low contact resistance series MEMS switches, 2002, pp. 223-226, vol. 1, IEEE MTT-S International Microwave Symposium Digest, New York, NY.

Seeger et al., "Stabilization of Electrostatically Actuated Mechanical Devices", (1997) International Conference on Solid State Sensors and Actuators; vol. 2, pp. 1133-1136.

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Office Action dated Oct. 10, 2007 in U.S. Appl. No. 11/228,118.

IPRP for PCT/US05/034198 filed Sep. 23, 2005.

ISR and WO for PCT/US05/034198 filed Sep. 23, 2005.

Invitation to Pay Additional Fees for PCT/US05/034198 filed Sep. 23, 2005.

First Office Action dated Apr. 11, 2008 in Chinese App. No. 200580031458.2.

Office Action dated Oct. 22, 2008 in U.S. Appl. No. 11/228,118.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax | ns # METHOD AND SYSTEM FOR DRIVING INTERFEROMETRIC MODULATORS

RELATED APPLICATIONS

This application claims priority to U.S. Provisional Application No. 60/613,319 titled "Method and System for Driving Interferometric Modulators," filed Sep. 27, 2004, which is incorporated by reference in its entirety and assigned to the assignee of the present invention.

BACKGROUND OF THE INVENTION

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display, includes an array of interferometric modulators, and a driving circuit coupled to said array, the driving circuit configured to provide actuation signals to drive said array based on temperature.

In another embodiment, a display comprises an array of first interferometric modulators, one or more second interferometric modulators, a measuring circuit configured to measure an actuation voltage of said one or more second interferometric modulators, and a first driving circuit coupled to said array of first interferometric modulators and configured to provide driving signals to drive said array of first interferometric modulators based on the actuation voltage measured by said measuring circuit, the array of first interferometric modulators and said one or more second interferometric modulators have, respectively, a first and a second electromechanical response, wherein said first and second electromechanical responses have a predetermined relationship with each other.

In another embodiment, a method of driving an array of interferometric modulators includes measuring the actuation voltage of one or more test interferometric modulator, and providing drive signals to an array of display interferometric modulators based on said measured actuation voltage, wherein said display interferometric modulator is configured to output light to a viewer.

In another embodiment, a method for manufacturing a display includes forming an array of first interferometric modulators, forming one or more second interferometric modulators, providing a measuring circuit configured to measure an actuation voltage of said one or more second interferometric modulators, and providing a first driving circuit coupled to said array of first interferometric modulators and configured to provide driving signals to drive said array of first interferometric modulators based on the actuation voltage measured by said measuring circuit.

In another embodiment, a method of driving an array having a plurality of interferometric modulators configured into a display includes sensing a temperature at a predetermined location in the display, communicating a sensor signal based on the sensed temperature to a display driver, generating an actuation signal in the display driver based on the sensor signal, and providing the actuation signal to the array.

In another embodiment, a display includes means for displaying image data, and means providing actuation signals to drive said displaying means based on a temperature of the display.

In another embodiment, a display includes a first means for modulating light, a second means for modulating light, means to measure an actuation voltage of said second means for modulating light, and means for driving said first means for modulating light, said driving means coupled to said first means for modulating light and configured to provide driving signals to drive said first modulating means based on the actuation voltage measured by said measuring means, where the first means for modulating light and said second means for modulating light have, respectively, a first and a second electromechanical response, where the first and second electromechanical responses have a predetermined relationship with each other.

In another embodiment, a method of driving a display of interferometric modulators includes measuring a transition voltage of one or more of a plurality of interferometric modulators of the display, determining a drive voltage for operating the plurality of the interferometric modulators based on the measured transition voltage, and providing said determined drive voltage to the plurality of interferometric modulators.

In another embodiment, a system of driving a display of interferometric modulators includes a sensor circuit configured to measure a transition voltage of one or more of a plurality of interferometric modulators in the display, the sensor circuit also configured to determine a drive voltage for operating the plurality of interferometric modulators based on the measured transition voltage, and a drive circuit coupled to said sensor circuit and configured to provide the determined drive voltage to the plurality of interferometric modulators.

In another embodiment, a system of driving a display of interferometric modulators includes means for measuring a transition voltage of one or more of a plurality of interferometric modulators in the display, means for determining a drive voltage for operating the plurality of the interferometric modulators based on the measured transition voltages and means for providing the determined drive voltage to the plurality of interferometric modulators.

DETAILED DESCRIPTION OF THE CERTAIN EMBODIMENTS OF THE INVENTION

Figure 1:
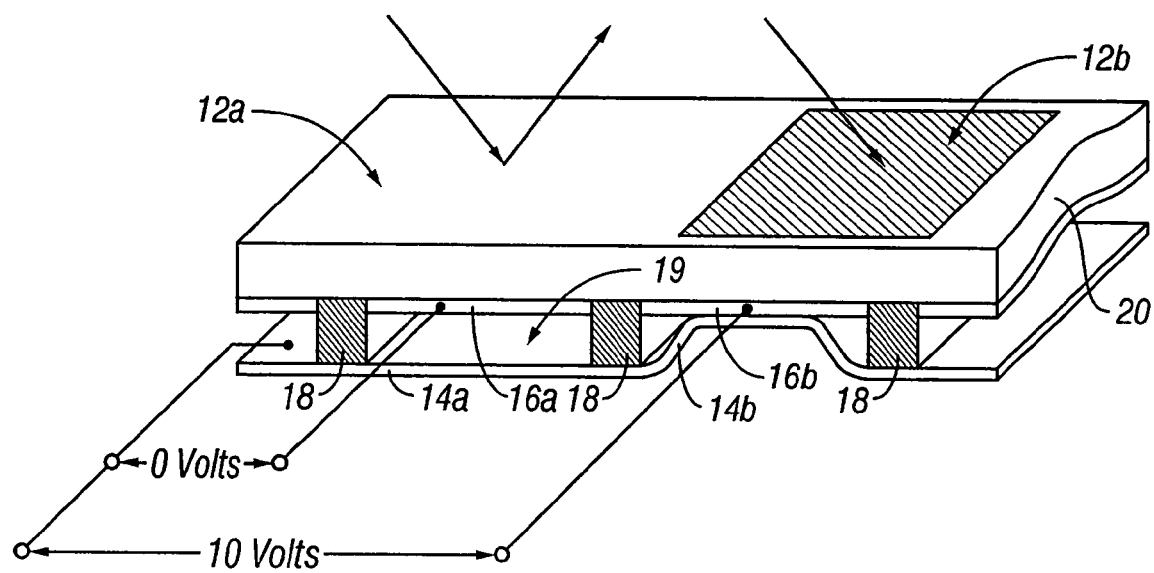
FIG. 1 is an isometric view schematically depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The amount of voltage applied by a control system that is necessary to place an modulator into an actuated state (the "actuation voltage") can change due to a number of detrimental operating factors that affect the interferometric modulator, including, for example, temperature, changes in the electromechanical properties of the interferometer, electrical charge buildup, and physical wear of the mechanical mirror. As described in more detail below, the actuation voltage applied to an interferometric modulator as a combination of two voltages, a column bias voltage ($V_{bias}$) and a row voltage. Changes in the electro-mechanical properties of the interferometer, electrical charge buildup, and physical wear of the mechanical mirror typically affect the actuation voltage only after a significant amount of use or after the passage of a certain amount of time. The temperature operating temperature of the interferometric modulator affects characteristics of the movable reflective layer 14 immediately such that a large change in temperature can cause a significant change in the actuation voltage. Depending on the environmental conditions in which the interferometric modulator is used, for example, incorporated in a display on a device placed on the dashboard of an automobile in Arizona during the summer, or on a device exposed to sub-zero winter temperatures, a significant temperature change of the interferometric modulator can occur within hours or even minutes. In one embodiment of the invention, a sensor monitors a temperature existing at a location in a device having a display incorporating interferometric modulators and provides a signal related to the temperature to the driving circuit for the display. The driving circuit, using predetermined information that correlates the sensed temperature to the necessary voltage required to operate the display at various temperatures, drives the display to operate over a wide range of temperatures by adjusting the bias voltage based on the signal it receives from the sensor.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
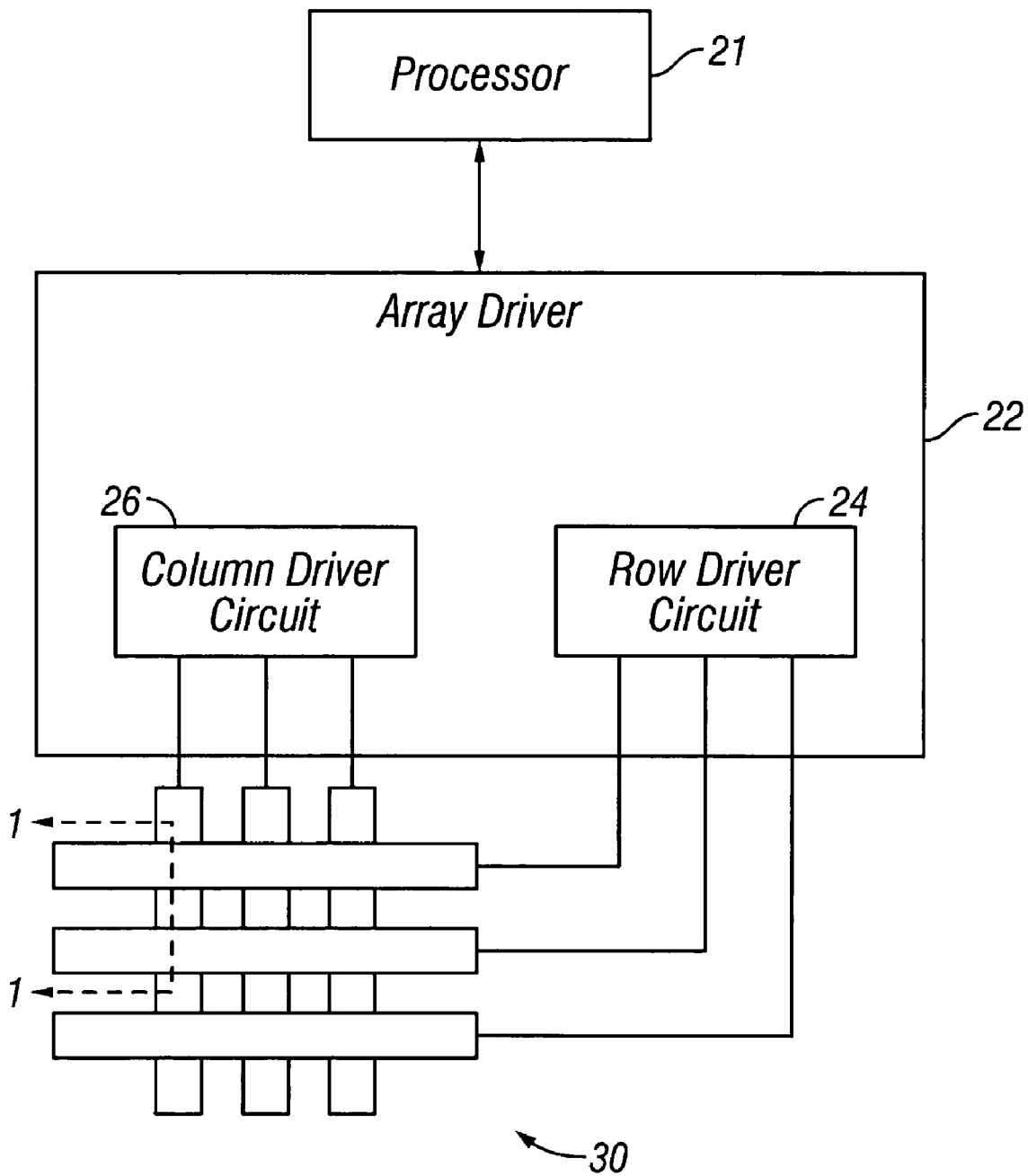
FIG. 2 is a system block diagram schematically illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
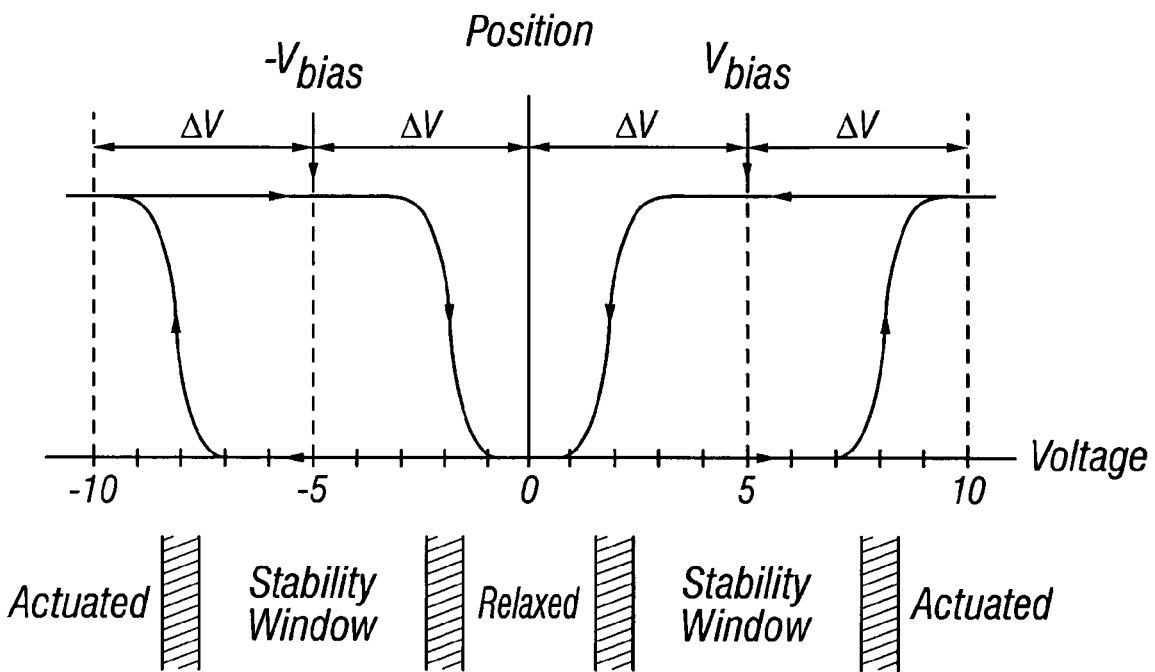
FIG. 3 is a schematic diagram of movable mirror position versus applied voltage for one exemplary embodiment of an interferometric modulator of FIG. 1.
FIG. 4 is a schematic illustration of a set of row and column voltages that may be used to drive an interferometric modulator display.
Figure 5A:
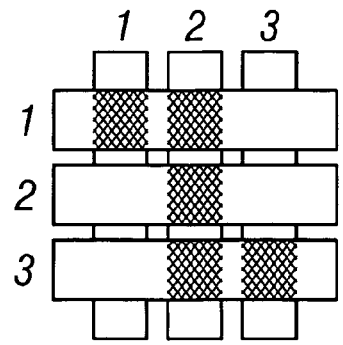
FIG. 5A illustrates one exemplary frame of display data in the 3×3 interferometric modulator display of FIG. 2.
Figure 5B:
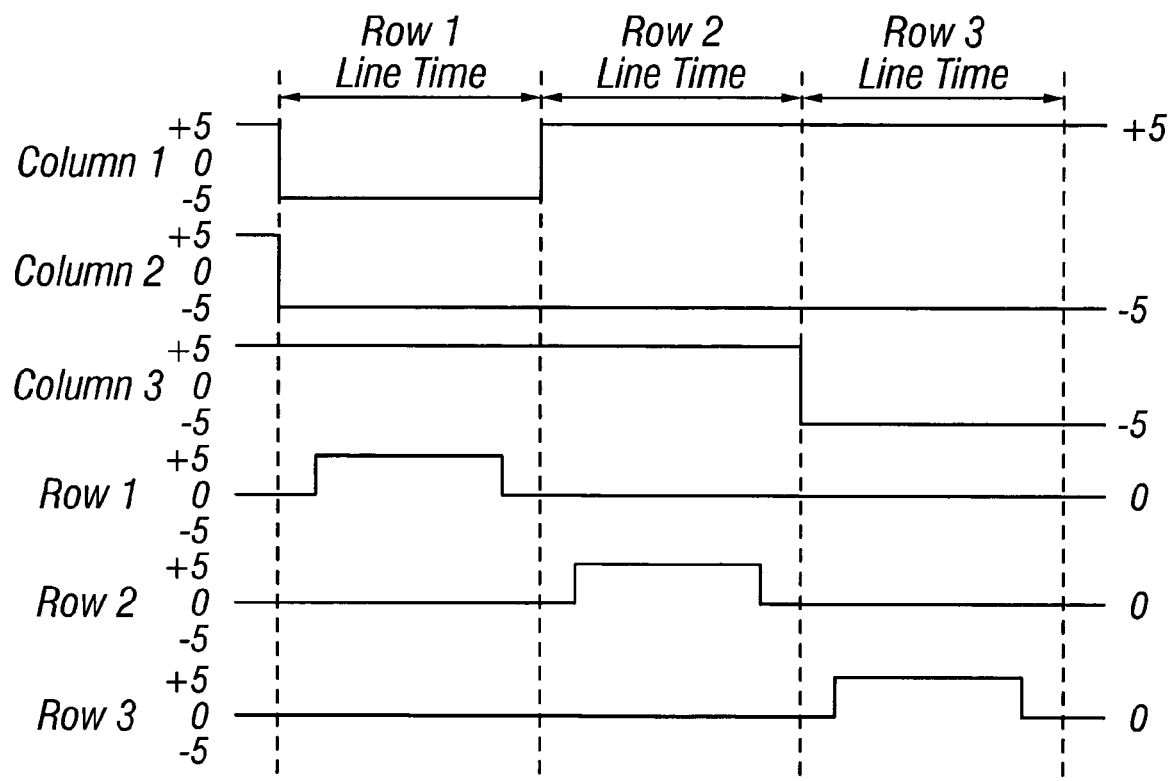
FIG. 5B illustrates one exemplary timing diagram for row and column signals that may be used to write the frame of FIG. 5A.

FIGS. 4, 5A and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
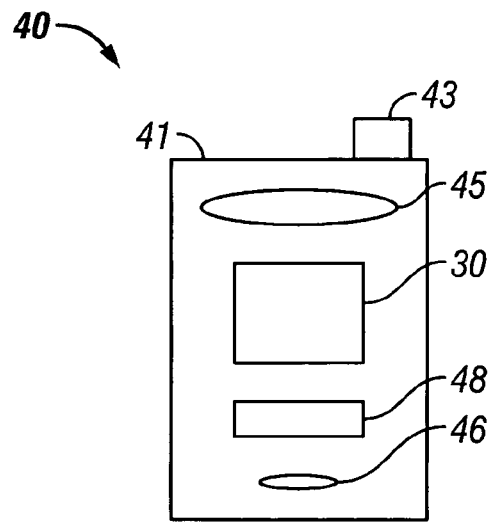
FIGS. 6A and 6B are system block diagrams schematically illustrating an embodiment of a visual display device comprising a plurality of interferometric modulators.
Figure 6B:
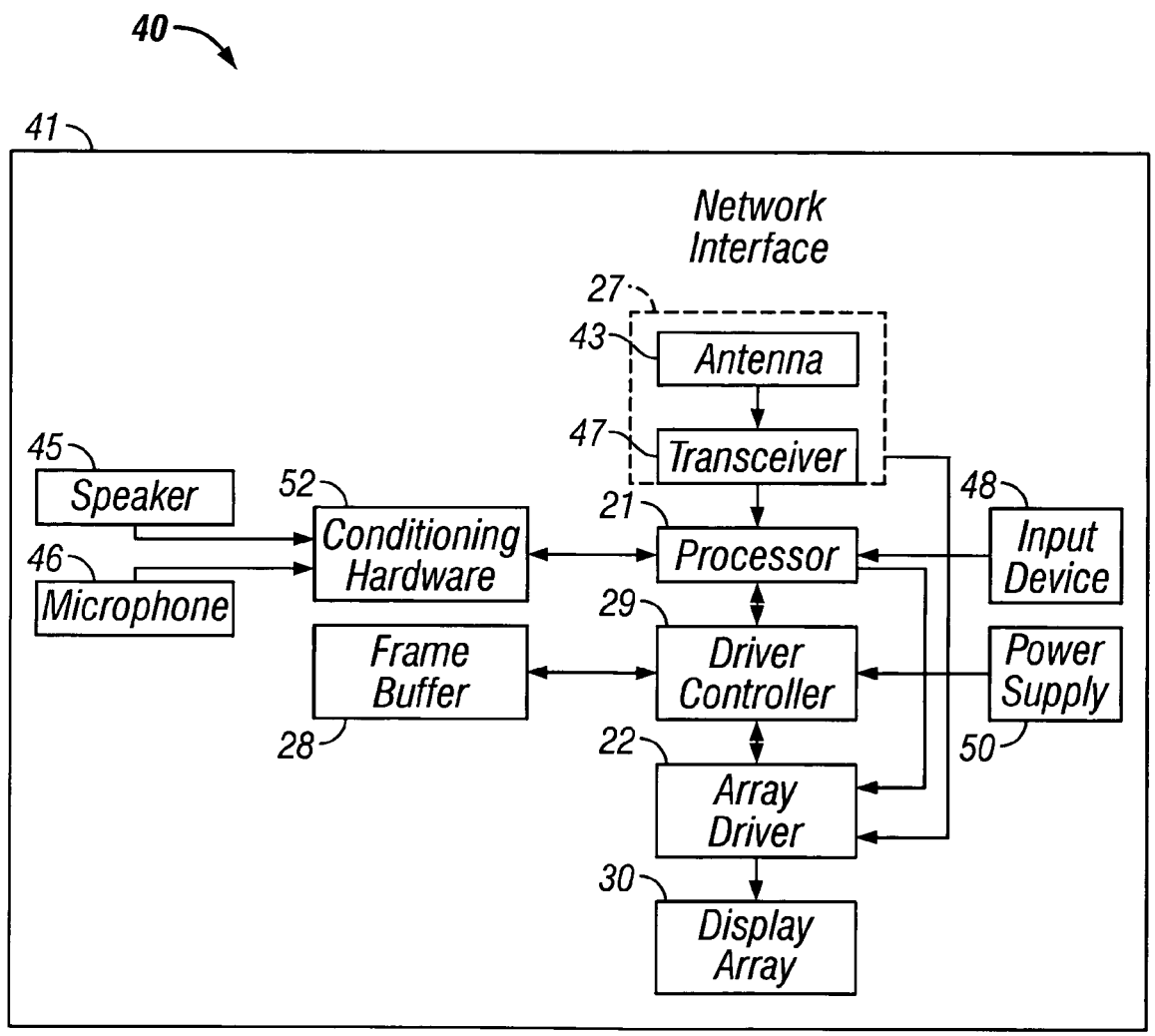

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
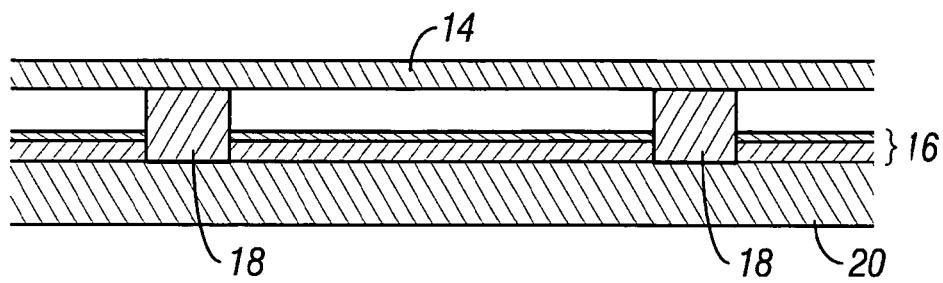
FIG. 7A is a schematic cross section of the device of FIG. 1.
Figure 7B:
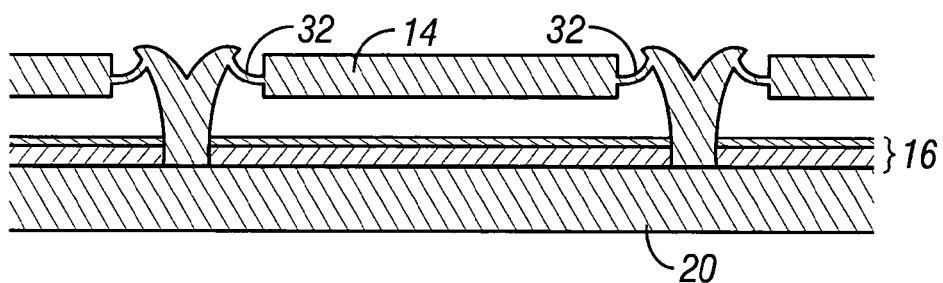
FIG. 7B is a schematic cross section of an alternative embodiment of an interferometric modulator.
Figure 7C:
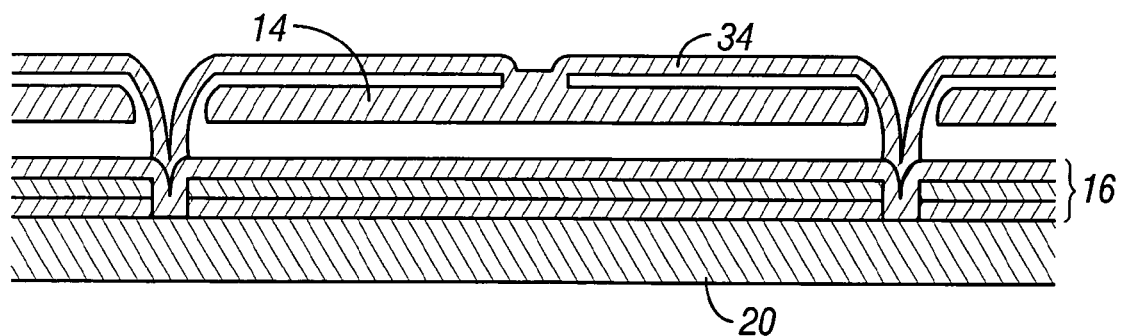
FIG. 7C is a schematic cross section of another alternative embodiment of an interferometric modulator.
Figure 7D:
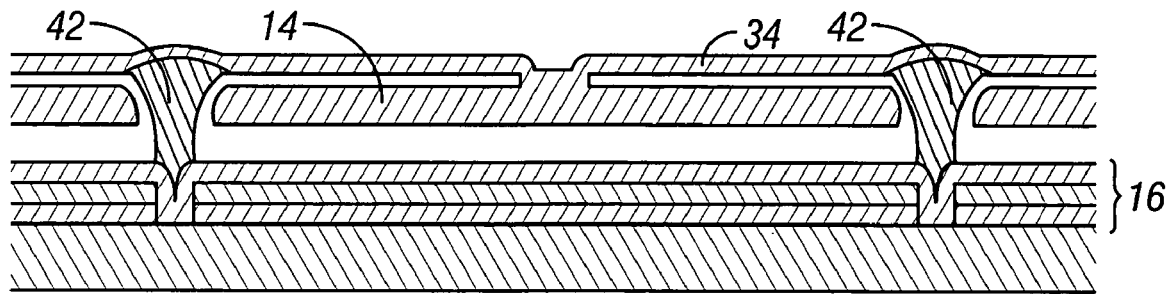
FIG. 7D is a schematic cross section of yet another alternative embodiment of an interferometric modulator.
Figure 7E:
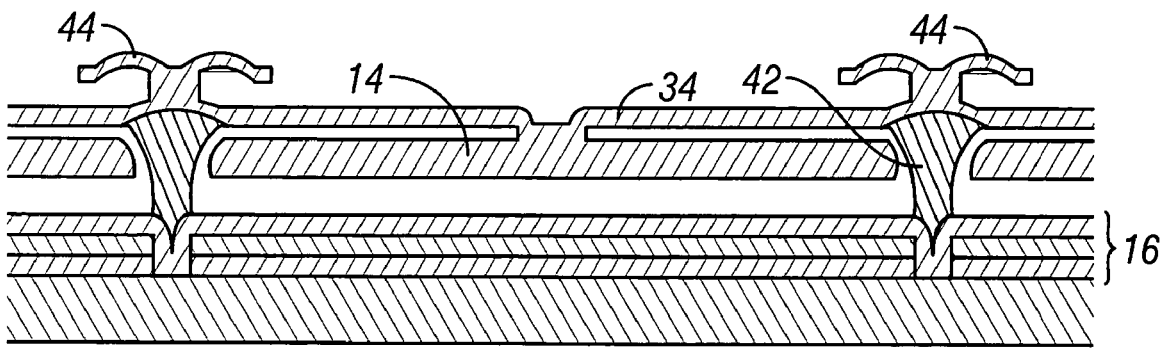
FIG. 7E is a schematic cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

The amount of voltage applied by a control system that is necessary to place the movable mirror of an interferometric modulator in an actuated state is referred to as the actuation voltage. For example, as illustrated in FIG. 3, the actuation voltage is about 9-10 volts, so that the application of about −10 volts or about +10 volts actuates the movable reflective layer 14b (as illustrated in FIG. 1) of an interferometric modulator and the application of about 0 volts relaxes the movable reflective layer 14a (as illustrated in FIG. 1) of the interferometric modulator. The actuation voltage can change over time due to a number of factors including, for example, temperature, changes in the electromechanical properties of the interferometer, and physical wear of the mechanical mirror.

Some of these factors (e.g., changes in the electromechanical properties of the interferometric modulator, and physical wear of the mechanical mirror) typically affect the bias voltage only after a significant amount of use or after the passage of a certain amount of time. Temperature, however, affects characteristics of the movable reflective layer 14 in a short period of time and cause a significant change in the voltage required to operate the interferometric modulator. Depending on the environmental conditions in which the interferometric modulator is used, for example, as incorporated in a display on a device placed on the dashboard of an automobile in Arizona during the summer, or in a device exposed to sub-zero winter temperatures, a significant temperature change of the interferometric modulator can occur within hours or even minutes. Sensing a temperature existing at a location in such a device and, using predetermined information that correlates the sensed temperature to the necessary voltage required to operate the interferometric modulators at that temperature, the display can be efficiently driven to operate over a wide range of temperatures by adjusting the bias voltage as a function of the temperature.

Figure 8:
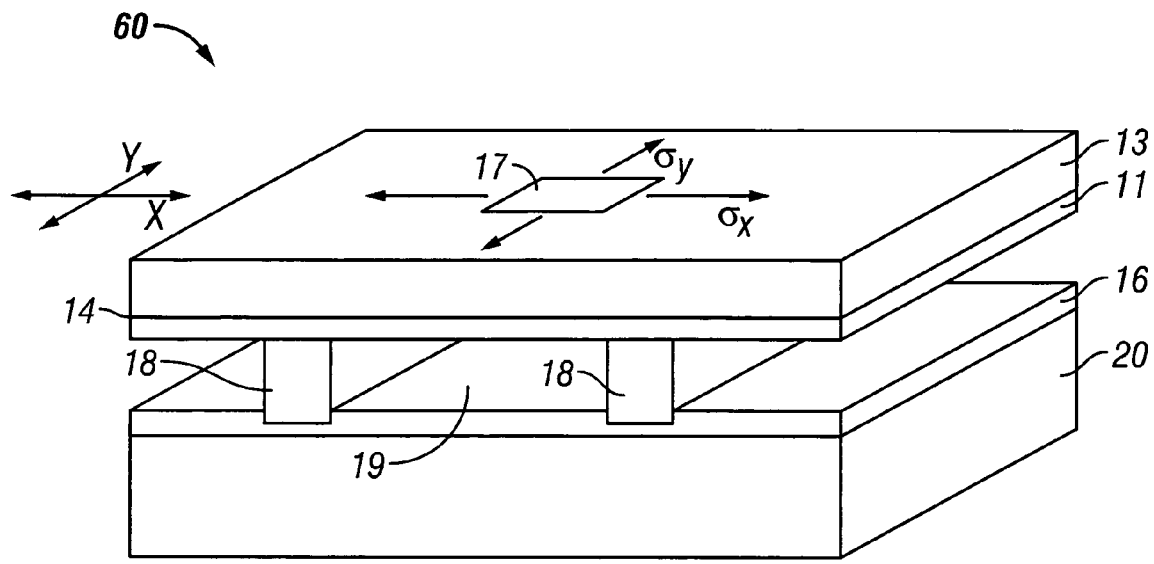
FIG. 8 is a perspective view of an interferometric modulator illustrating multiple layers of the movable reflective layer.

FIG. 8 is a perspective illustration of one embodiment of an interferometric modulator 60 in a released (or relaxed) state. The interferometric modulator 60 includes an optical stack 16 that typically includes an electrode layer, an absorber layer and an electrode layer (not shown separately) on a transparent substrate 20. The relative thickness of the substrate 20 is much greater than the thickness of the optical stack 16. For example, in some embodiments the substrate 20 is about 700 μm thick and the optical stack 16 is about 1 μm or less thick. In some embodiments, the substrate 20 is glass. Supports 18 provide support for the movable reflective layer 14 which is separated from the optical stack 16 by a cavity 19.

The movable reflective layer 14 includes a relatively thin layer of a first material 11 and a relatively thick layer of a second material 13. In the embodiment of FIG. 8, the first material 11 is aluminum disposed in a layer which is about 300 Angstroms thick, and the second material 13 is Nickel disposed in a layer that is about 1000 Angstroms thick. In other embodiments, the first material 11 and the second material 13 can comprise other materials, for example, an aluminum alloy. The thickness of the first material 11 and the second material 13 can also be different in other embodiments. In some embodiments, the movable reflective layer 14 can be monolithic, including only a uniform single layer comprised of, for example, nickel, nickel alloy, aluminum, or an aluminum alloy. In other embodiments, the movable reflective layer 14 can include more than two layers of materials. In some embodiments, the layer of the first material 11 can be thicker than the layer of the second material 13, which can change the relationship of the dominant material for stress and strain.

The stress which is introduced in an interferometric modulator through a change in temperature of an interferometric modulator, and the resulting strain, can significantly affect the movement of the movable reflective layer 14. Stress is the force exerted per unit area by a body upon an adjoining part, and strain is the deformation or change in dimension occasioned by stress. Both the resistance to stress and the elastic limit depend on the composition of the solid. When a body is subjected to pull, it is said to be under tension, or tensile stress, and when it is being pushed, it is under compression, or compressive stress. Tensile stress is generally considered to be positive, while compressive stress is considered to be negative. As the temperature of material changes, the body expands or contracts in accordance with the coefficient of thermal expansion (CTE) of the materials from which it is made. The normal operating temperature of an interferometric modulator can be, for example, about −40° C. to +70° C. As temperature changes, the substrate 20, the first material 11 and the second material 13 of the movable the reflective layer 14 expand and contract differently in accordance with their respective CTE'S. This expansion and contraction of the two different materials introduces strain in the movable reflective layer 14, which causes a corresponding change in stress in the movable reflective layer 14.

Although both the layer of the first material 11 and the layer of the second material 13 expand and contract as a function of temperature as expressed by their respective CTE's, the CTE of the thicker layer (e.g., the second material 13), dominates the amount of expansion or contraction. The amount of expansion and contraction of the substrate 20 and optical stack 16 is dominated by the expansion and contraction of the substrate 20 due to its much greater thickness. Typically, the CTE of the substrate 20 is less than the CTE of the layer of second material 13, so that the layer of second material 13 expands and contracts more than that the substrate 20 as the reference temperature changes. However, the supports 18 constrain the expansion and contraction of the movable reflective layer 14 relative to the substrate 20. Accordingly, as the temperature changes, the movable reflective layer 14 experiences a change in strain in the planar x and y direction of the movable reflective layer 14 and a corresponding change in stress ($\sigma$) occurs also in the x and y direction of the movable reflective layer 14. Stress of the movable reflective layer 14 affects its ability to move between an actuated and an unactuated position, and accordingly affects the bias voltage. In one embodiment, the substrate 20 comprises display grade Corning 1737, an aluminosilicate glass with a CTE of $3.76 \times 10^{-6}/°$ C. A typical composition of aluminosilicate glass is 55.0% $SiO_2$, 7.0% $B_2O_3$, 10.4% $Al_2O_3$, 21.0% CaO, and 1.0% $Na_2O$.

Figure 9:
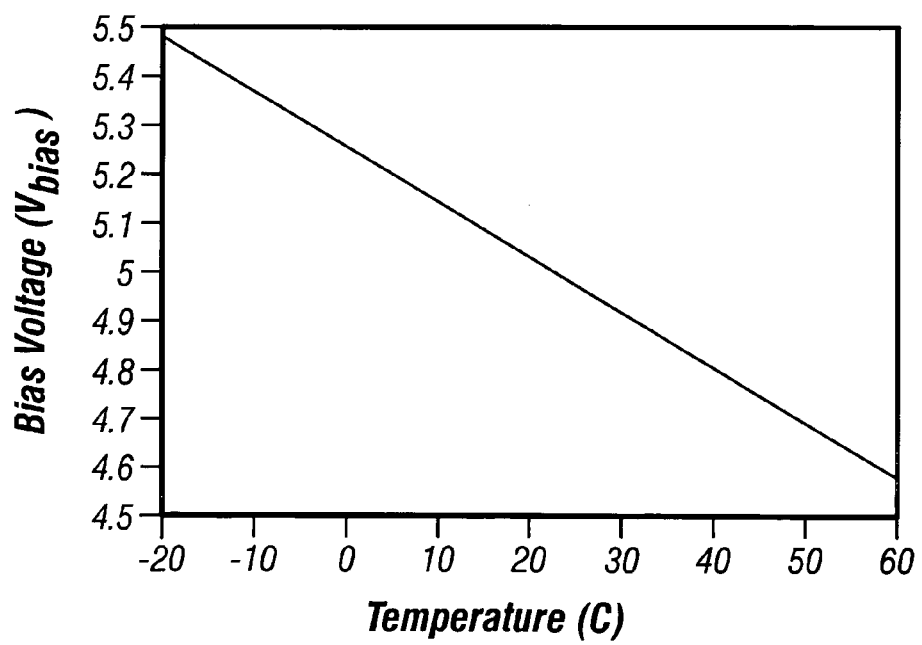
FIG. 9 is a graph illustrating the relationship between operational voltage of a interferometric modulator and temperature.

FIG. 9 is a graph illustrating the relationship between temperature (x-axis) and bias voltage (y-axis) of an interferometric modulator, according to one embodiment. As shown in FIG. 9, the bias voltage of an interferometric modulator over a certain temperature range is approximately inversely related to the temperature of the interferometric modulator, e.g., as the temperature of the interferometric modulator increases, the bias voltage decreases. Even a small change of the bias voltage (e.g., about a 0.25 volts or less, in some embodiments) can be significant to affect the interferometric modulator's operation depending on hysteresis characteristics of the interferometric modulator. In the graph of FIG. 9, bias voltage changes by about 0.25 volts during a temperature change of about 25° C.

As FIG. 9 exemplifies, a change in temperature causes an increase or decrease in stress in a planar x and y direction of the movable reflective layer 14 which affects the bias voltage. Temperature based compensation of the voltage applied to control the interferometric modulator 60 can be advantageously used to keep the interferometric modulator 60 operating consistently. That is, when the temperature of the interferometric modulator increases, a lower activation voltage is provided, and when temperature decreases, a higher activation voltage is provided.

As described above, the actuation voltage applied to an interferometric modulator as a combination of two voltages that are applied to the interferometric modulator, a column bias voltage ($V_{bias}$) and a row voltage. In the embodiment described herein, the row voltage does not change from its values of either $+\Delta V$ or $-\Delta V$ (e.g., see FIG. 4). The bias voltage can be adjusted by the array driver 22, for example, as a function of temperature thus providing an actuation voltage that is compensates for temperature. The relationship between the bias voltage, also referred to herein as the operational voltage ($V_{Opp}$), stress ($\sigma$), and temperature (T) is illustrated in the following equations:

$$V_{Opp} \propto \sqrt{\sigma} \qquad \text{Equation 1}$$

$$\sigma = \sigma_o + k\Delta T \qquad \text{Equation 2}$$

wherein $\sigma_o$ is the residual stress at, for example, a reference temperature, and k is a constant. A typical reference temperature is a room temperature of about 25 degrees Celsius. As an example of the relationship between these parameters in one embodiment, every one degree Celsius increase in temperature results in a 2 MPa change in stress in the movable reflective layer and ~11 mV shift in operational voltage. In a common embodiment, the stress ($\sigma$) within layer 14 of the interferometric modulator 60 is a tensile stress, which means that $\sigma$ is greater than or equal to zero.

The residual stress, $\sigma_o$, in layer 14 refers to the stress at a reference temperature when in a relaxed (unactuated) state, which is a result of a process used to manufacture interferometric modulator 60. Manufacturing processes influence the residual stress, $\sigma_o$, since interferometric modulator 60 is exposed to various processing temperatures and since layer 14 is initially formed on a sacrificial layer that is ultimately removed.

In FIG. 8, the stresses, $\sigma_x$ and $\sigma_y$, along the respective x and y axes, within layer 14 are shown with respect to a unit area 17. The change in actuation voltage resulting from a change in temperature of the interferometric modulator can be shown by the following equation:

$$V_{act} \propto \left(\frac{h^{3/2}}{L}\right)\sqrt{\sigma(T)*t} \qquad \text{Equation 3}$$

where L is distance between the supports of an interferometric modulator, h is the air gap thickness through which the reflective layer 14 moves, $\sigma(T)$ is the stress in the movable reflective layer 14 which is a function of the reference temperature T, and t is the thickness of the movable reflective layer 14. The air gap, the thickness of the movable reflective layer, and the distance between the supports are selected during the design of the interferometric modulator and thus are not subject to change once the modulator is fabricated.

The temperature dependence of the stress $\sigma$ can be described as $\sigma = \sigma_0 - \sigma_T(T)$ where $\sigma_0$ is the residual stress, at a reference temperature, in the movable reflective layer 14 after fabrication, which is dominated by the CTE of the second material 13, as described above. In some embodiments, the reference temperature is the reference temperature.

The thermal expansion mismatch between the moveable reflective layer 14 and substrate 20 causes a thermal strain and resulting thermal stress that is a function of the thermal expansion mismatch. For example, where the moveable reflective layer 14 is nickel and the substrate 20 is Corning Glass No. 1737, the thermal mismatch ($\Delta$CTE) can be described as $$\Delta CTE = \alpha_1 - \alpha_2 \qquad \text{Equation 4}$$

where $\alpha_1 = 13.0 \times 10^{-6}/°C$. (the CTE of Nickel), and $\alpha_2 = 3.76 \times 10^{-6}/°C$. (the CTE of Corning Glass No. 1737). The thermal strain $\epsilon_T$ can then be described as $$\epsilon_T = (\Delta CTE)(\Delta T) \qquad \text{Equation 5}$$

wherein $\Delta T$ is the temperature change with respect to a reference temperature. The resulting thermal stress can them be described as $$\sigma_T(T) = E_1\epsilon_T = E_1(\Delta CTE)(\Delta T) \qquad \text{Equation 6}$$

where $E_1$ is the elastic modules of nickel, and $\Delta T$ is the temperature change with respect to a reference temperature. The actuation voltage can then be described as a function of temperature as shown in either of the following equations:

$$V_{act}(T) \propto \left(\frac{h^{3/2}}{L}\right)\sqrt{((\sigma_o - E_1(\alpha_1 - \alpha_2)\Delta T))*t} \qquad \text{Equation 7}$$

or $$V_{act}(T) \cong k_1\sqrt{\sigma_o t}\left(1 - \frac{k_2\Delta T}{2\sigma_o}\right) \qquad \text{Equation 8}$$

wherein $\Delta T$ is the temperature change with respect to a reference temperature. Equation 8 shows the actuation voltage as a linear approximation of the Equation 7. FIG. 9 is a graph illustrating the relationship between temperature and bias voltage in a particular embodiment, and illustrating that this relationship is nearly linear over a certain temperature range. Note that $k_1$ and $k_2$ are constants that simplify the representation of the equation.

The residual stress of the movable reflective layer 14 is controllable to some extent during fabrication by the selection of variables that minimize the mismatch of CTE's between the movable reflective layer 14 and the substrate 20, the thickness of the layers of each material used (e.g., the first material 11 and the second material 13), and the modulator fabrication technique.

Figure 10:
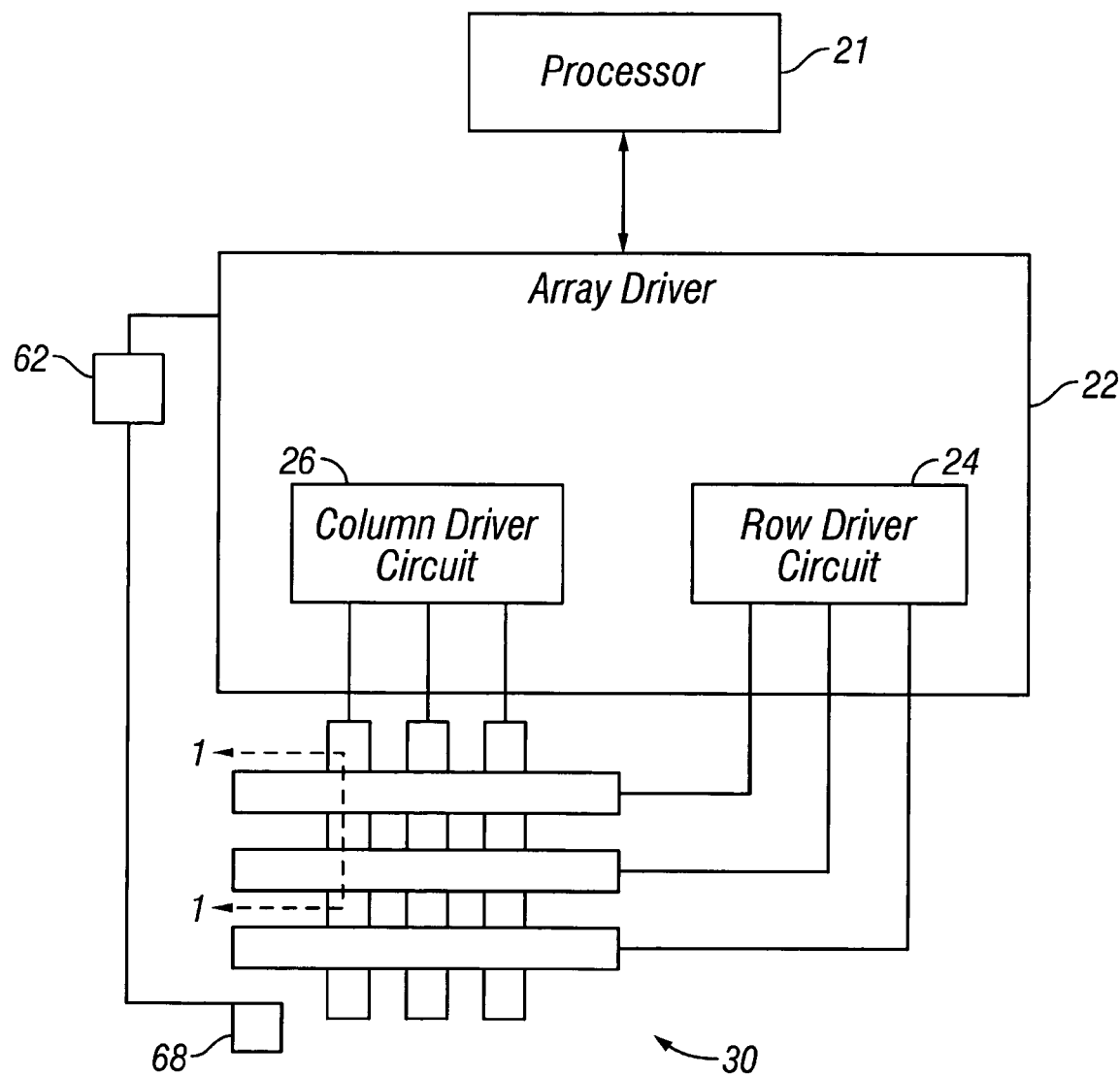
FIG. 10 is a system block diagram illustrating one embodiment of an electronic device incorporating a 3×3 interferometric modulator display and temperature sensor.

FIG. 10 is a system block diagram similar to FIG. 2 that schematically illustrates one embodiment of an electronic device incorporating a 3×3 interferometric modulator display, and where the driving circuit is configured to provide actuation signals to drive the array 30 based on a temperature present. The block diagram of FIG. 10 illustrates a sensor 62 coupled to the circuit that drives the array 30. The sensor 62 senses a temperature condition and provides a signal to the array driver 22 that is based on the sensed temperature. The sensor 62 can include various embodiments of sensor circuitry, for example, circuitry that senses temperature and generates a corresponding signal, or circuitry that is influenced by temperature so that signals from the sensor correspond to the temperature. For example, in one embodiment the sensor 62 includes a thermistor whose resistance changes with temperature. Because of the known dependence of resistance on temperature, the resistor can be used as a temperature sensor. In some embodiments, the thermistor is fabricated on silicon in conjunction with fabricating the array of interferometric modulators. In some embodiments, the sensor 62 comprises a thermocouple.

In the embodiment illustrated in FIG. 10, the sensor 62 is located outside of the driving circuit and coupled to the array driver 22. The array driver 22 is configured to use the signal it receives from the sensor 62 to provide signals to drive the array 30 that correspond to the temperature. In one embodiment, the array driver 22 uses a pre-determined look-up table stored in memory to determine the appropriate signal to provide a signal to the array based on the received temperature-based signal. In other embodiments where the sensor 62 is disposed in the array driver 22 (e.g., FIG. 12) or in the processor (e.g., FIG. 11), a look-up table can also be used to determine the appropriate signal to provide a signal to the array based on the received temperature-based signal. In another embodiment, circuitry in the array driver 22 (or the processor 21) can approximate the curve illustrated in FIG. 9 (for example, approximate the relationship between temperature and operational voltage as linear) and then provide signals to the array 30 that are proportional to the received temperature-based signal using the defined relationship between temperature and operational voltage.

The temperature sensed by the sensor 62 can be a temperature at the array 30, at a location substantially proximal to the array 30, or at a location other than that of the array 30. For example, in various embodiments, the sensor 62 senses the temperature of the array driver 22, the processor 21, or at the sensor 62 itself. In some embodiments the sensor 62 is configured to sense the temperature at a predetermined location in a display which includes the array 30, or to sense the temperature at a predetermined location in an electronic device that includes the array 30.

In some embodiments, the sensor 62 also includes a sensing element 68 placed at a particular location to sense the temperature, where the location is preferably determined as it relates to the temperature under which the interferometric modulators of the array 30 operate. In this embodiment, the sensing element is located near the array 30. In other embodiments, the sensing element 68 can be placed, for example, in the driving circuit, anywhere in a display that includes the array 30, or anywhere in an electronic device that includes the array 30. Circuitry in the sensor 62 detects the influence of a temperature on the sensing element 68, and communicates a signal to the driving circuit (e.g., array driver 22) based on the temperature.

Figure 11:
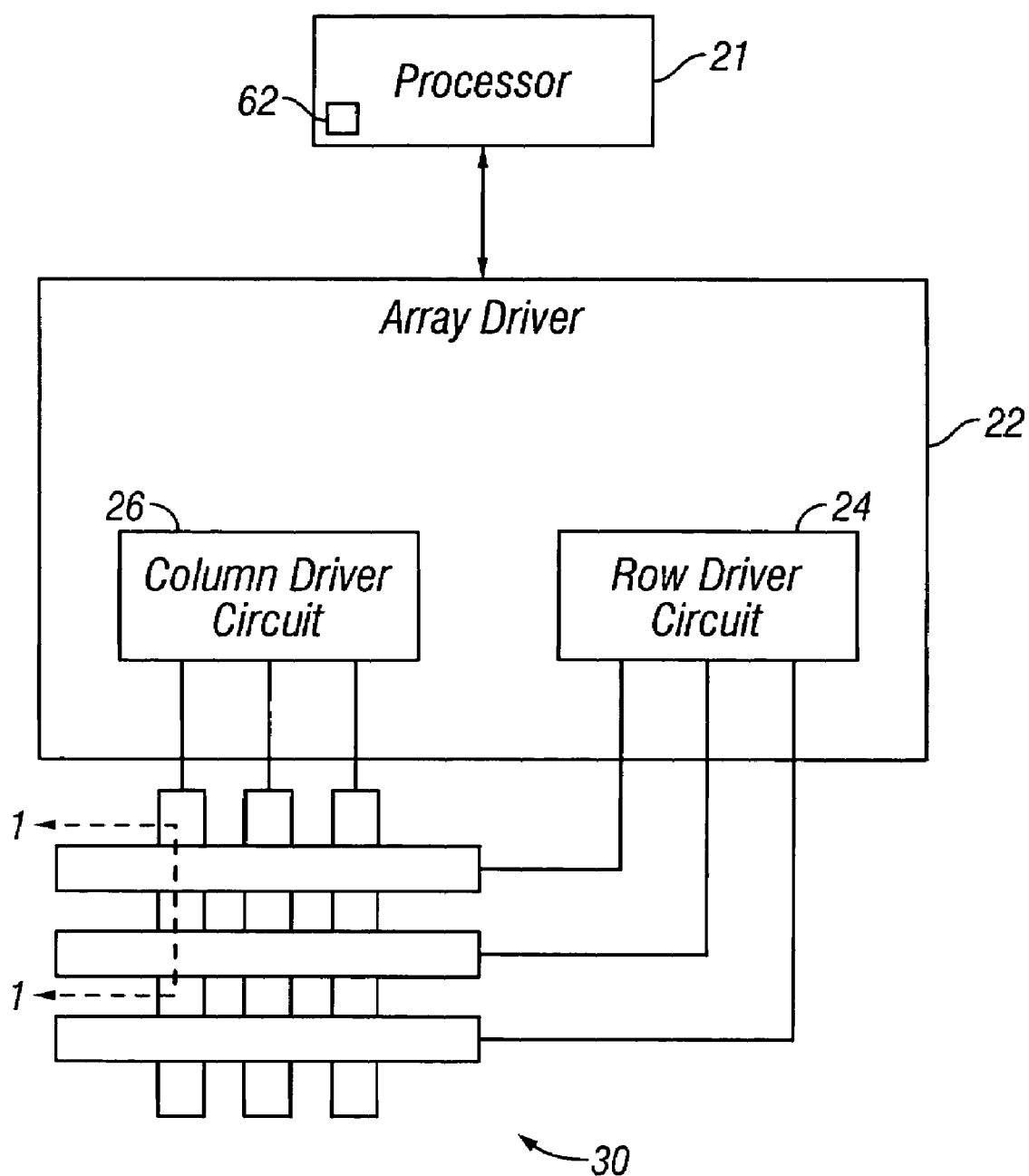
FIG. 11 is a system block diagram illustrating another embodiment of an electronic device incorporating a 3×3 interferometric modulator display and temperature sensor.

The sensor 62 can be located in various places, depending on the particular implementation desired. FIG. 11 is a system block diagram illustrating another embodiment of an electronic device incorporating a 3×3 interferometric modulator display and the sensor 62. In FIG. 11, the sensor is located in the processor 21. In one embodiment, the sensor 62 senses a temperature in the processor that is related to the temperature of the array 30, and a signal based on the sensed is used to drive the array 30. In some embodiments, the processor 21 can have a connection to connect a sensing element (not shown) so that the sensor 62 can sense the temperature at a location outside of the processor 21.

Figure 12:
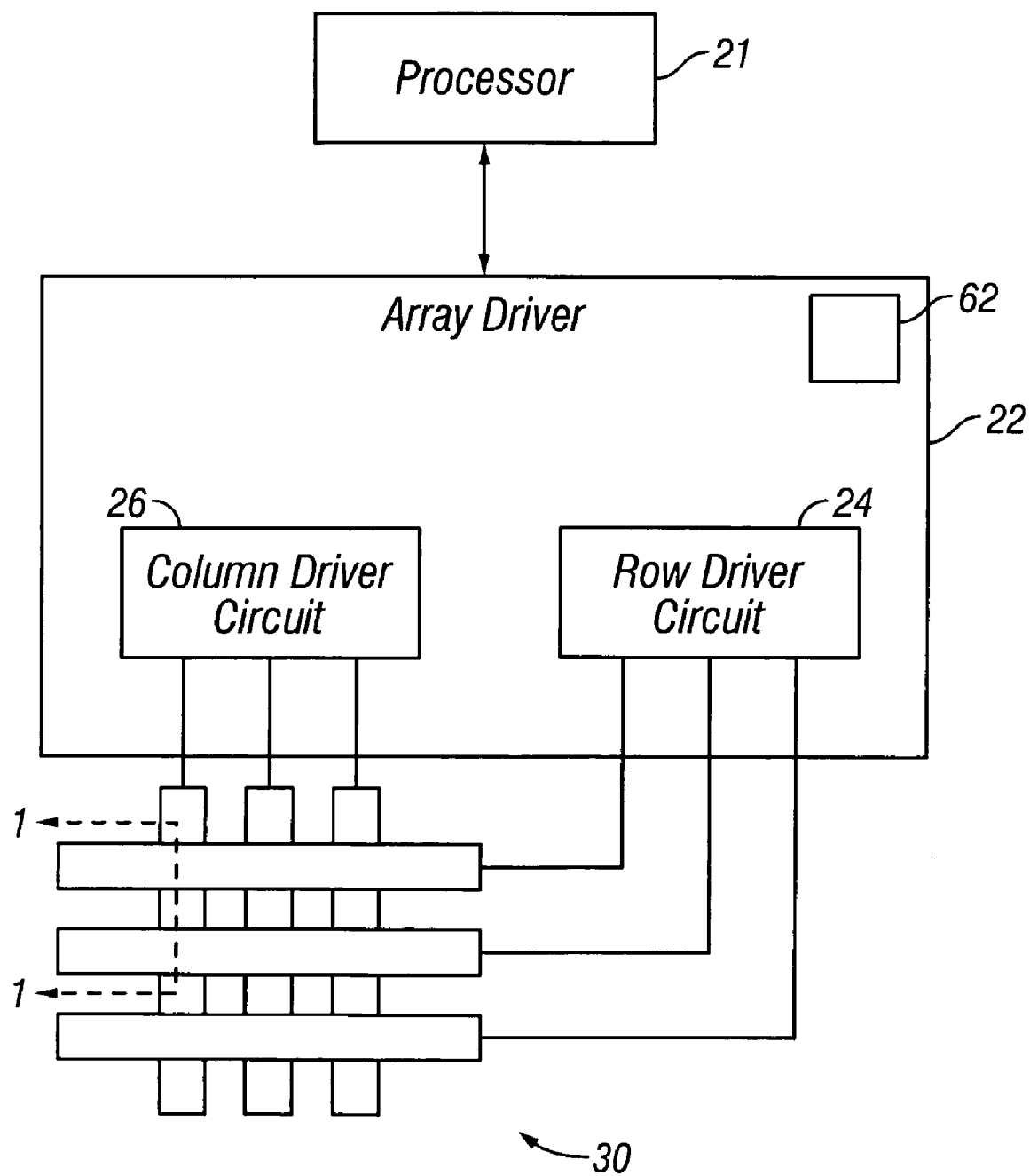
FIG. 12 is a system block diagram illustrating another embodiment of an electronic device incorporating a 3×3 interferometric modulator display and temperature sensor.

FIG. 12 is a system block diagram illustrating another embodiment of an electronic device incorporating a 3×3 interferometric modulator display and sensor 60. Here, the sensor 60 is located in the array driver 22. In one embodiment, the sensor 62 senses a temperature in the array driver 22 that is related to the temperature of the array 30, and a signal based on the sensed temperature is used to drive the array 30. In some embodiments, the array driver 22 can have a connection to a sensing element (not shown) so that the sensor 62 can sense the temperature at a location outside of the array driver 22.

Figure 13:
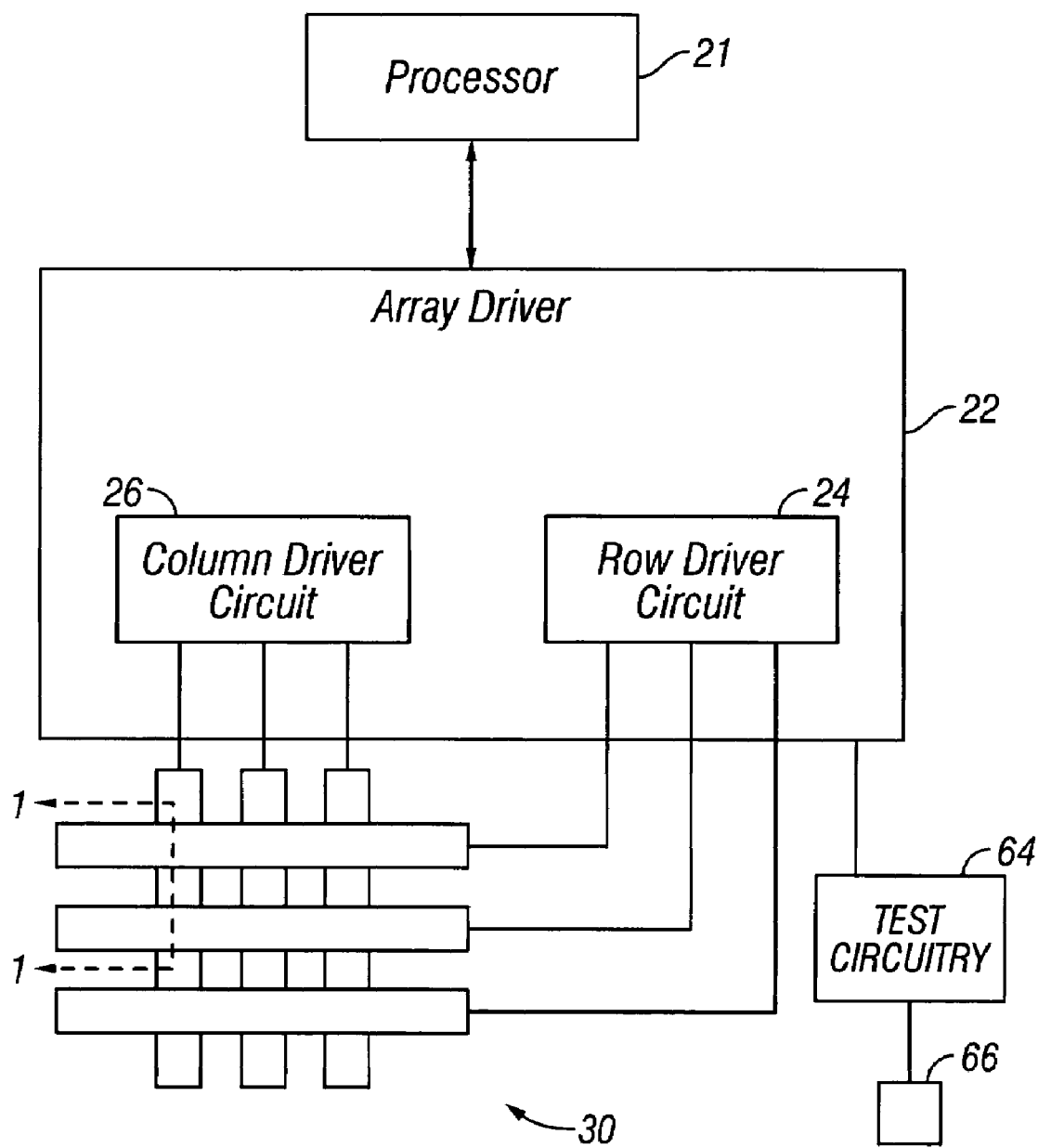
FIG. 13 is a system block diagram illustrating an embodiment of an electronic device incorporating a 3×3 interferometric modulator display and a test interferometric modulator.

FIG. 13 is a system block diagram schematically illustrating an embodiment of an electronic device incorporating a 3×3 interferometric modulator display and circuitry to control the amount of voltage applied by the array driving system to that which is necessary to place the interferometric modulators in an actuated or an released state. This embodiment includes test circuit 64 that is connected to the driving circuit, e.g., in particular array driver 22, and can comprise one or more test interferometric modulator(s) 66, (or test modulator). To account for the effect of temperature, the test circuit 64 determines the amount of voltage that is required to place the mirror of the test modulator 66 in an actuated and/or released state, and sends a signal corresponding to the determined voltage to the driving circuit, e.g., the array driver 22. The array driver 22 then adjusts the drive voltages to achieve an appropriate operational voltage based on the signal from the test circuit 64. As a result of monitoring the actuation and/or release of the one or more test modulators, the array driver 22 can provide drive signals to the array 30 based on the measured actuation/release voltage. In some embodiments, the drive signals provided to the array are proportional or substantially equal to the measured actuation voltage. In some embodiments, a second driving circuit is included in the display to drive one or more test modulator(s) 66.

In one embodiment, the test interferometric modulator 66 is an interferometric modulator having a similar structural configuration as an interferometric modulator found in array 30. The test modulator 66 serves as a platform upon which test drive signals can be applied and from which measurements are recorded. Usually, such test interferometric modulators are not used to output light for display purposes. The overall dimensional scale of the test interferometric modulator 66 can be similar to or different than that of interferometric modulators within array 30. The overall or specific dimensions of the test interferometric modulator 66 can be varied with respect to the interferometric modulators of array 30 depending upon the intended test measurement objectives. In alternative embodiments, the test interferometric modulators 66 have different structural configurations from those of array 30.

In some embodiments, two or more test modulators can be used (not shown). The test modulators can be located in various places in the display, including at the end of each row and/or column of the modulators in the array. Typically, the test modulators are positioned such that they are not visible to a viewer of the display, e.g., they do not receive or output any visible light to a viewer.

The test circuit 64 can determine the voltage that is required to actuate the test modulator 66 by applying a voltage to the test modulator 66 to "toggle" the modulator between an actuated state and a release state, while monitoring the test modulator 66 to determine at what voltage the modulator changes states. In some embodiments, the test circuit 64 is driven by a triangular-shaped voltage wave, as illustrated by signal 90 in FIG. 14. In another embodiment, a test modulator is driven with a signal having a triangle waveform and an amplitude that is proportional to a voltage level required to actuate the test modulator.

The test circuit 64 is preferably driven at the same frequency at which the display is being driven, but other frequencies can also be used to drive the test circuit 64. Also, the test circuit 64 is preferably driven at the same frame rate as the array 30, but other frame rates can be used too. For example, in some embodiments, the test modulator is driven with a signal having a frequency that is equal to or proportional to the display frame rate. In another embodiment, the frequency of the signal used to drive the test modulator is approximately one-half of the display frame rate.

In some embodiments, the voltage amplitude of the driving signal 90 is greater than the expected actuation voltage to ensure the actuation voltage is reached. In some embodiments, the voltage amplitude of the drive signal 90 may increase when the reference temperature decreases. In other embodiments, the signal used to drive the test modulator is periodic and the drive signals to drive the array are image content specific.

Figure 14:
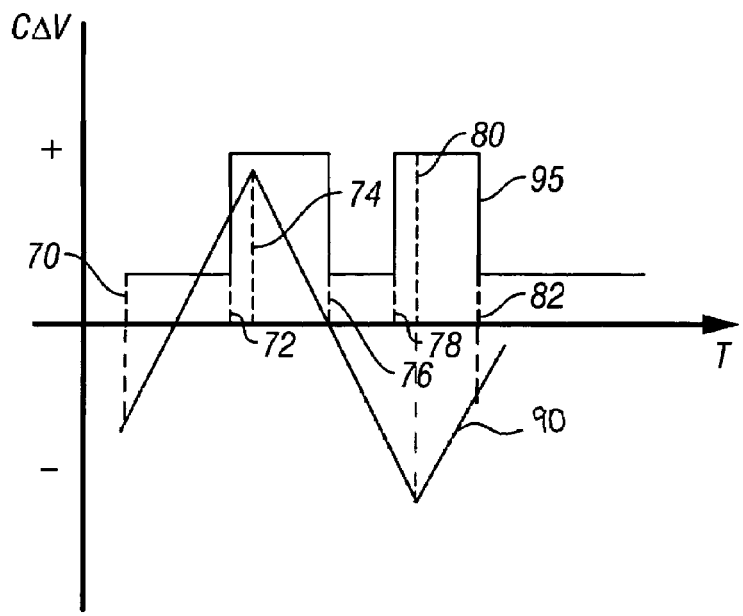
FIG. 14 is a graph of time (x-axis) verses capacitance and voltage (y-axis), and illustrates the capacitance of an interferometric modulator resulting from an applied voltage.

In one embodiment, the capacitance of the test modulator 66 is monitored to determine at what voltage the modulator changes states, and this information is used to change the drive voltage based on the applied voltage level at the time of the change in capacitance and the sign of the change in capacitance. FIG. 14 shows a graph of time (x-axis) verses capacitance and voltage (y-axis), and includes signal 90 and capacitance curve 95. The signal 90 represents the voltage applied across the test modulator 66 to actuate and release the movable reflective layer 14, according to one embodiment. The capacitance curve 95 represents the measured capacitance of the test modulator 66 that results from applying the voltage illustrated by the signal 90.

Here, the test modulator 66 begins in a released position. The voltage applied to the test modulator 66 begins at a negative value in state 70, increases to a positive peak value at state 74, decreases to a negative peak value at state 80, and increases again to a small negative value at state 82. The capacitance curve 95 reflects the measured capacitance of the test modulator 66 while the voltage changes in accordance with signal 90. The measured capacitance curve 95 starts at a low value at state 70 and then changes to a high value at state 72 as the voltage is increased, indicating the test modulator 66 actuated. At state 76, the capacitance curve 95 changes back to a low value indicating the test modulator 66 released. At state 78 the capacitance curve 95 changes to a high value, indicating the test modulator 66 again is actuated. Finally at state 82 the capacitance curve 95 changes back to a low value indicating the test modulator 66 is again released. In other embodiments, the current flow to the test modulator 66 is monitored to determine when it actuates or releases. When the test modulator 66 actuates or releases, the current will spike and the capacitance will increase or decrease.

In one embodiment, the test modulator 66 is "toggled," e.g., a series of voltages are applied to the test modulator 66 so that the voltage switches from a positive to a negative voltage, or from a negative to a positive voltage. In this condition, the capacitance is monitored as the voltage is toggled to determine the level of voltage which causes the test modulator 66 to actuate and release, and the actuation signal provided to drive the array 30 is adjusted accordingly. Such toggling can be performed upon startup of the modulator, and then periodically to account for changes that occur during its use. In some embodiments, the process is performed as a result of an input received by a user or by an automatic process, e.g., diagnostics.

The electromechanical response of a test modulator can be configured to have a predetermined relationship with the electromechanical response of the interferometric modulators of the array 30. For example, the predetermined relationship can be such that the electromechanical responses are substantially proportional, substantially equal, or that they have substantially the same electromechanical behavior. By knowing the relationship between the electromechanical response of the test interferometric modulators 66 with respect to the interferometric modulators of array 30, measurement of the voltage levels required to actuate and release the test interferometric modulators 66 allows for adjustment of the drive signals sent to array 30 to compensate for various factors that affect performance. As previously mentioned, one factor is that of temperature. Note that the use of the test interferometric modulators 66 allows for compensation of the drive signals to array 30 without requiring the measurement of temperature.

Test interferometric modulators 66 can also be used to measure long term drift of offset voltage in the electrical and mechanical performance of the interferometric modulators of array 30. Drift of offset voltage can be a result of, for example, long term exposure to adverse temperature, mechanical or structural changes in the device, or electrical charge buildup in the optical stack and/or the moving mirror layer 14.

The test modulators can have different electromechanical behavior to, for example, measure severe temperature changes, voltage spikes, or other conditions that would warrant the display to initiate a diagnostic procedure, such as shutting down and restarting.

Test interferometric modulators 66 can also be used to measure the offset voltage, which is the voltage level at approximately the midpoint between a positive and negative hysteresis window of an interferometric modulator system. A recursive algorithm of applying a corrective voltage pulse to the test and array interferometric modulators and measuring the offset voltage of the test interferometric modulator can be used to adjust or reset an offset voltage.

In some embodiments, the interferometric modulators in the array and the test modulators each have an electrical response function that is related in a predetermined relationship. For example, a test modulator can have a different resistance in its column electrode than the interferometric modulators in the array so that the electrical behavior of the test modulator is different from the interferometric modulators in the array but its mechanical behavior is the same. In other embodiments, the interferometric modulators in the array and the test modulators each have a mechanical response function that is related in a predetermined relationship. For example, the test modulator can have different physical or mechanical properties, e.g., higher post density, than the interferometric modulators in the array so that the mechanical behavior of the test modulator is different but its electrical behavior is the same.

In another embodiment, circuitry coupled to the driving circuit (e.g., the array driver 22, the processor 21, or the driver circuits 24, 26) has temperature influenced circuitry, e.g., it has one or more electronic characteristics that change in a predetermined manner corresponding to a change in the temperature of the display. Based on the changed electronic characteristic, the driving circuit generates actuation signals for the array 30 that correspond to the change in temperature so that the interferometric modulators of the array 30 operate with an appropriate operational voltage. This temperature influenced circuitry can be coupled to the driving circuit, embodied in the driving circuit, or embodied in the sensor 62.

Figure 15:
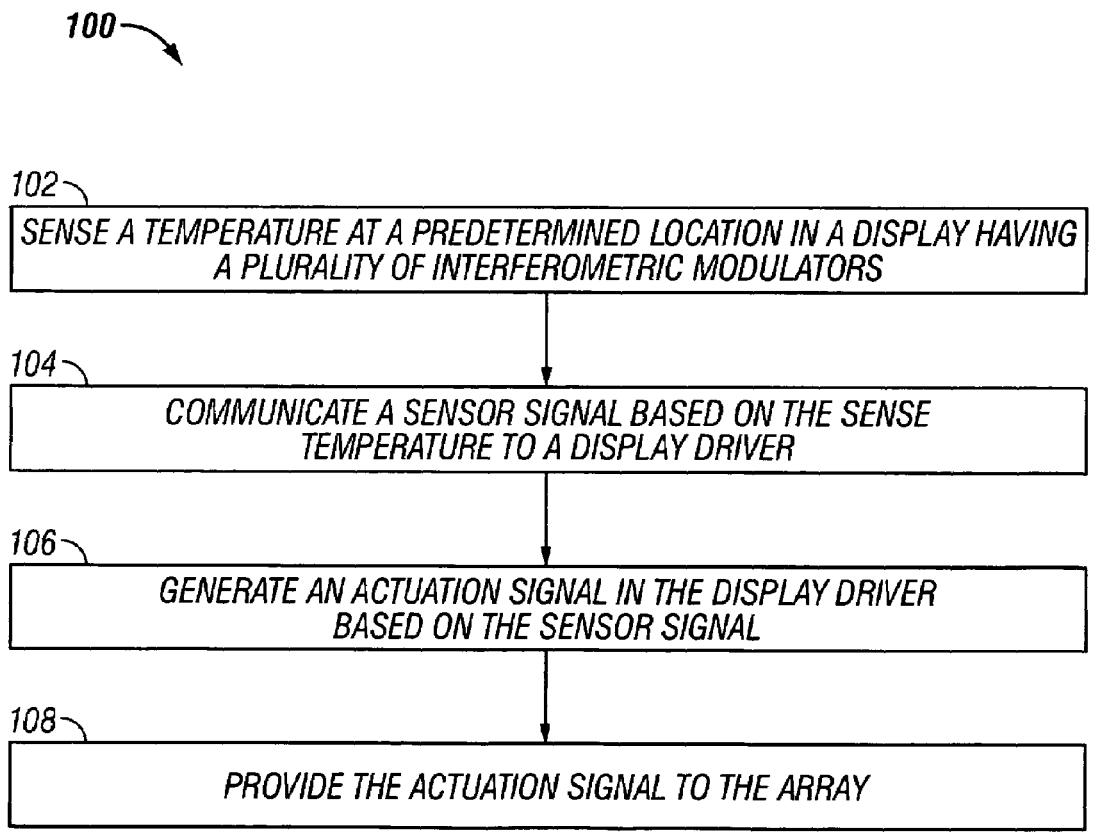
FIG. 15 is a flow diagram illustrating a process of driving an array based on a sensed temperature.

FIG. 15 illustrates a process 100 of driving an array 30 (e.g., FIG. 2) having a plurality of interferometric modulators that can be used with the previously described embodiments. In state 102, a temperature is sensed at a predetermined location in the display. The temperature can be sensed using a sensor, test circuitry, a test interferometric modulator, or temperature influenced circuitry.

In state 104, a sensor signal, which is based on the sensed temperature, is communicated to a display driver. Subsequently, in state 106, the process 100 generates an actuation signal based on the sensor signal that was communicated to the display driver. The level of the generated actuation signal is adjusted according to the temperature sensed such that as the temperature of the interferometric modulators in the array 30 increases, the voltage applied to the interferometric modulators as dictated by the actuation signal decreases so that the driving circuit provides the proper operational voltage to the array 30. Conversely, as the temperature of the interferometric modulators in the display decreases, the voltage applied to the interferometric modulators as dictated by the actuation signal increases. Finally, in state 108, the process 100 provides the actuation signal to the array 30.

In some embodiments, the measurements made upon test interferometric modulators 66 can also be performed upon the interferometric modulators of array 30 such that a dedicated test interferometric modulator 66 would be optional. For example, a small number of interferometric modulators of array 30 (for example, one or more) can be used as both test and display interferometric modulators. In many cases, it would be desirable to perform the tests upon interferometric modulators located to one side or within one corner of a display screen so as to minimize any adverse optical effects of the test procedures. Also, in many cases, the dimensional and structural configuration of the interferometric modulators within an array 30 used for testing would be substantially the same as the interferometric modulators in the remaining portion of the array 30.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The invention claimed is:

1. A display, comprising:
   an array of interferometric modulators, each interferometric modulator having an actuated state and a released state; and
   a driving circuit coupled to said array, said driving circuit configured to provide signals to drive said array to actuated and released states based on temperature, the amplitude of said signals being inversely proportional to a change in temperature.

2. The display of claim 1, wherein the temperature is in the driving circuit, and wherein the temperature correlates to the temperature of the array.

3. The display of claim 1, wherein the temperature is outside of the driving circuit, and wherein the temperature relates to the temperature of the array.

4. The display of claim 1, wherein the temperature is a temperature substantially proximal to the array, and wherein the temperature relates to the temperature of the array.

5. The display of claim 1, further comprising a sensor that senses temperature, said sensor coupled to said driving circuit to provide a signal to said driving circuit corresponding to the temperature.

6. The display of claim 1, wherein said driving circuit comprises a sensor that senses temperature information proximal to the location of said sensor, said sensor being coupled to said driving circuit and configured to communicate the temperature information to said driving circuit, and wherein said driving circuit generates the signals to drive said array based on the temperature information communicated from said sensor.

7. A display comprising
   an array of interferometric modulators;
   a driving circuit coupled to said array, said driving circuit configured to provide actuation signals to drive said array based on temperature; and
   a sensor that senses temperature, said sensor coupled to said driving circuit to provide a signal to said driving circuit corresponding to the temperature,
   wherein said sensor comprises
      sensor circuitry; and
      a sensing element electrically connected to said sensing circuitry, said sensing element configured to be influenced by a temperature and disposed at a particular location in relation to the location of said sensor circuitry, and
   wherein said sensor circuitry is configured to detect the influence of the temperature on the sensing element, and communicate a signal corresponding to the temperature to said driving circuit, and wherein said driving circuit is configured to generate the actuation signals to drive said array based on the signal communicated from said sensor circuitry.

8. The display of claim 1, further comprising a sensor disposed external to said driver circuit that communicates a signal to said driving circuit based on a temperature sensed by said sensor at a location in the display, wherein said driving circuit generates the signals to drive said array based on the signal communicated from said sensor.

9. The display of claim 1, wherein said array of interferometric modulators comprises support structures, a reflective layer coupled to the supports, an electrode layer, and a gap though which the reflective layer moves in response to an actuation voltage applied between the reflective layer and the electrode layer.

10. A display comprising:
    an array of interferometric modulators and
    a driving circuit coupled to said array, said driving circuit configured to provide actuation signals to drive said array based on temperature,
    wherein the signals correspond to actuation voltages that are related to temperature by the following equation:

$$V_{act} \propto \left(\frac{h^{3/2}}{L}\right)\sqrt{\sigma(T)*t}$$

where L is distance between the supports of an interferometric modulator,
h is the gap thickness,
σ(T) is the residual stress in the movable reflective layer as a function of the reference temperature, and
t is the thickness of the movable reflective layer.

11. The display of claim 10, wherein σ (sigma) is the residual stress of Nickel.

12. The display of claim 10, wherein σ (sigma) is the residual stress of Aluminum.

13. The display of claim 1, further comprising:
    a display;

a processor that is in electrical communication with said display, said processor being configured to process image data; and a memory device in electrical communication with said processor.

14. The display of claim 13, further comprising a driver circuit configured to send at least one signal to said display.

15. The display of claim 13, further comprising a controller configured to send at least a portion of said image data to said driver circuit.

16. The display of claim 13, further comprising an image source module configured to send said image data to said processor.

17. The display of claim 16, wherein said image source module comprises at least one of a receiver, transceiver, and transmitter.

18. The display of claim 13, further comprising an input device configured to receive input data and to communicate said input data to said processor.

19. A method of driving an array having a plurality of interferometric modulators, each interferometric modulator having an actuated state and a released state, said interferometric modulators configured into a display, said method comprising:

sensing a temperature at a predetermined location in the display;

communicating a sensor signal based on the sensed temperature to a display driver;

generating a signal to drive said array in the display driver based on the sensor signal; and providing the signal to drive said array to the array, and wherein said signal to drive said array is provided with an amplitude that is inversely proportional to a change in temperature.

20. The method of claim 19, wherein the temperature is sensed at a location in the array.

21. The method of claim 19, wherein the temperature is sensed in the display driver.

22. The method of claim 19, wherein generating an signal to drive said array comprises generating an signal to drive said array with an amplitude component inversely proportional to a change in the sensed temperature.

23. A display, comprising:

means for displaying image data, said displaying means having an actuated and a released state; and means for providing actuation or release signals to drive said displaying means based on a temperature of the display, and wherein said signals to drive said displaying means are provided with an amplitude that is inversely proportional to a change in temperature.

24. The display of claim 23, wherein the displaying means comprise an array comprising a plurality of interferometric modulators.

25. The display of claim 23, wherein the providing means comprise an array controller.

26. The display of claim 23, further comprising:

means for communicating a signal corresponding to said temperature to said providing means.

27. The display of claim 26, wherein said sensing means comprise a sensor.

28. The display of claim 26, wherein said communicating means comprises an electrical connection between said sensor and said providing means.

29. The display of claim 26, further comprising:

means for determining the voltage required to actuate a interferometric modulator subject to the temperature; and means for communicating a signal corresponding to the actuation voltage to the providing means.

30. The display of claim 29, wherein said determining means comprises:

a test interferometric modulator; and test circuitry coupled to said test interferometric modulator, said test circuitry configured to determine the voltage required to actuate said test interferometer.

31. The display of claim 29, wherein said communicating means comprises said test circuitry connected electrically to said providing means, and configured to communicate a signal corresponding to the voltage required to activate said test interferometric modulator to said providing means.

32. A method of manufacturing a display, the method comprising:

forming an array comprising a plurality of interferometric modulators, each interferometric modulator having an actuated state and a released state;

coupling a driving circuit to said array, said driving circuit configured to provide signals to drive said array to actuated and released states based on a temperature of the display, and wherein said driving circuit provides signals with an amplitude that is inversely proportional to a change in temperature.

33. A display manufactured by the method of claim 32.

* * * * *